Aug. 23, 1966 A. OBEISSART 3,268,246
CONNECTORS, IN PARTICULAR FOR ELECTRIC CIRCUITS
Filed March 25, 1964 2 Sheets-Sheet 1

United States Patent Office 3,268,246
Patented August 23, 1966

3,268,246
CONNECTORS, IN PARTICULAR FOR
ELECTRIC CIRCUITS
Albert Obeissart, Boulogne-sur-Seine, France, assignor to Société Souriau & Cie, Gallieni, France, a society of France
Filed Mar. 25, 1964, Ser. No. 354,617
Claims priority, application France, Mar. 26, 1963, 929,328
4 Claims. (Cl. 285—277)

The present invention relates to connectors and more especially to connectors for electric circuits, comprising two parts, a male part and a female part, adapted to engage each other, in combination with locking means.

The chief object of this invention is to provide a simplified, although strong, connector of this type.

It consists chiefly in arranging the locking means of such connectors in the form of two rings, mounted on one of said parts and movable axially with respect to each other on said part, and one of which rings cooperates with a lug carried by the other part, in such manner as further to undergo an angular displacement during the connecting operation, in combination with means for angularly locking said two rings together at the end of the connecting operation, preferably in combination with resilient means.

A preferred embodiment of the present invention will be hereinafter described with reference to the appended drawing, given merely by way of example, and in which.

Figure 1:
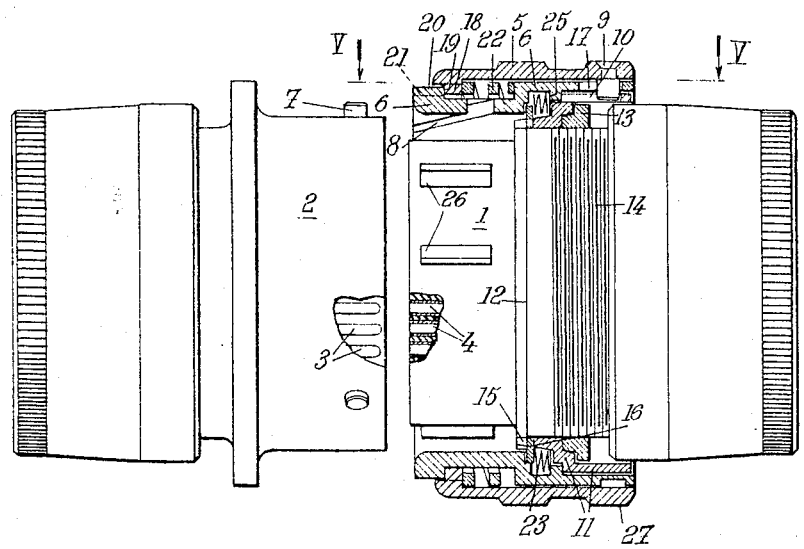
FIG. 1 shows, partly in elevation and partly in axial section, the male and female parts of a connector and the locking means according to the present invention, the assembly being shown in the position where said parts are away from each other, that is to say before the connecting operation.

The connector illustrated by the drawing, for connecting electric circuits together essentially comprises two cylindrical parts 1 and 2 in which part 1 penetrates into part 2 by engagement of the pins 3 into sockets 4. Such a device further includes locking means for preventing accidental disconnection.

Said locking means comprises two rings 5 and 6 mounted on part 1 and arranged in such manner:

(a) That they are slidable axially on said part 1, one of said rings 5 driving the other 6;

(b) that one of them, to wit 6, is further capable of an angular displacement intended to take place during the connecting operation through the action of lug 7 carried by the other part 2 and cooperating with an oblique groove 8 of ring 6; and (c) that means are provided so that, at the end of the connecting operation and for a given angular position of rings 5 and 6, said rings are angularly locked together, preferably in combination with spring means for opposing any unlocking.

In the embodiment shown in the drawing, ring 6, which is capable of an angular displacement, is disposed inside ring 5 which is acted upon by the operator when he engages part 1 to move it toward part 2.

Ring 5 is guided axially with respect to part 1 by means of a lug 9 rigid with said ring and slidable in a longitudinal slot 10 provided in a piece 11 rigid with part 1. This piece 11 consists of a ring kept in position against a shoulder 12 of part 1 by a holding collar 13 screwed on a threaded portion 14.

In order to ensure a correct operation of said ring 11, it is provided with projections 15 adapted to engage into corresponding recesses provided in shoulder 12 and also in an abutment piece 16 which will be hereinafter referred to.

It should be noted that lug 9 extends through an aperture 17 (FIGS. 1, 5 and 6) provided in the rear portion of inner ring 6 and sufficiently wide to enable said piece 6 to have both an axial displacement and an angular displacement.

A lug 18 provided at the front part of ring 5 and adapted to bear against the rear face 19 of a shoulder 20 provided at the front part of ring 6, is adapted to penetrate into a notch or recess 21 provided in said shoulder, for a given angular position of ring 6.

A spring 22 interposed between rings 5 and 6 urges them axially with respect to each other so as to keep lug 18 constantly applied against rear face 19 or in recess 21.

Figure 5:
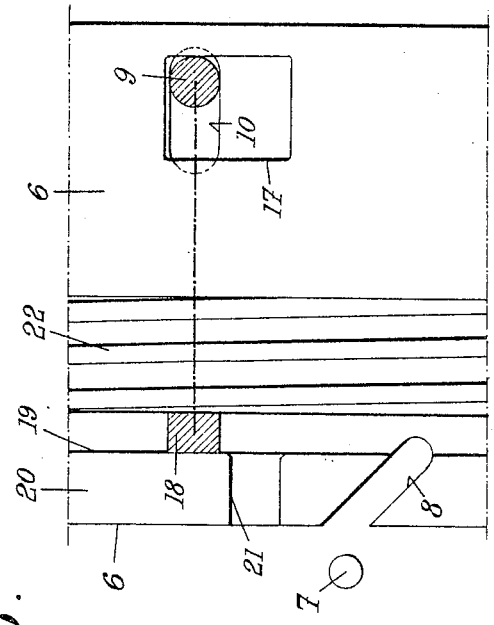

This spring 22 may further exert, if necessary, a torsional return action so that rings 5 and 6 normally occupy, when piece 1 is unconnected, a predetermined relative angular position, such as shown by FIG. 5, for which lug 18 is offset with respect to recess 21. But this elastic return action is not necessary and moreover could be obtained in any suitable manner.

The device may further include resilient means interposed between part 1 and the assembly of the two rings above mentioned in such manner as to urge part 1 toward part 2 when the system constituted by rings 5 and 6 has been locked on the lug 7 of part 2.

In the embodiment shown by the drawing, said resilient means consists of a spring 23 interposed between abutment 16 rigid with part 1 and an abutment 25 rigid with ring 6.

FIG. 1 further shows notches 26 carried by part 1 and adapted to ensure the positioning of this part with respect to part 2, in a known manner.

In the unconnected position the parts are as shown by FIGS. 1 and 5, lug 18 being offset with respect to recess 21.

In order to assemble the parts together, part 1 is held so as to move it toward part 2 and groove 8 is positioned so as to be located opposite the corresponding lug 7.

The operator then exerts a frontward thrust upon ring 5, ring 6 being driven along together with ring 5 due to the fact that lug 18 pushes the edge 19 of shoulder 20.

When the thrust is further exerted, oblique groove 8 cooperating with lug 7 causes ring 6 to rotate until lug 18 comes opposite recess 21. Said lug 18 enters said recess under the effect of the thrust exerted on piece 5 by the operator, which thrust is transmitted through spring 22.

Figure 2:
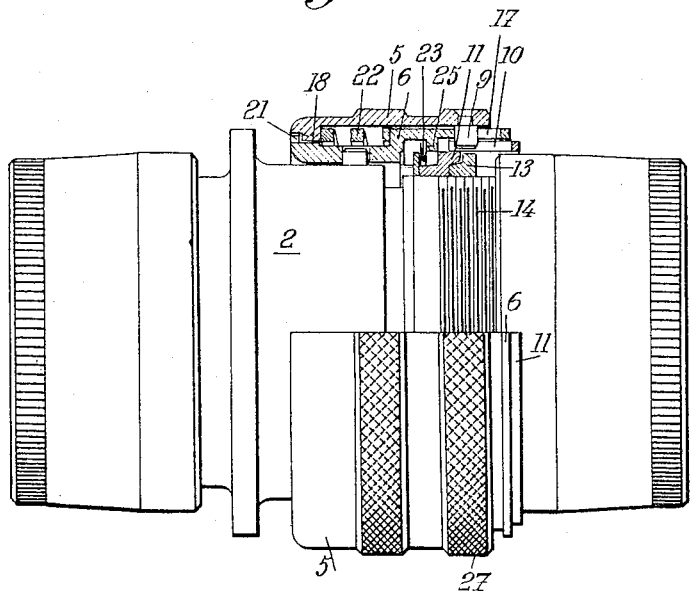
FIG. 2 shows the same parts after the connecting operation.
Figure 4:
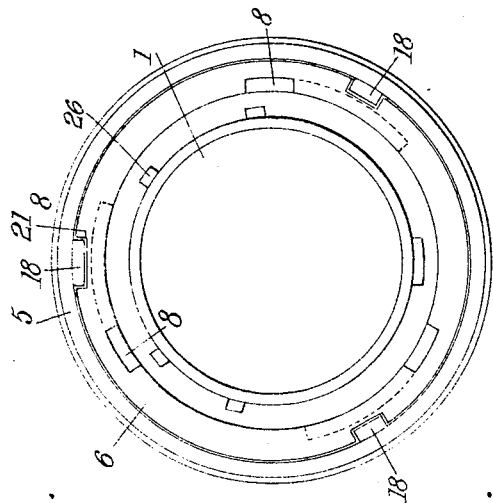
FIG. 4 is a view similar to FIG. 3 but in the connected position.
Figure 3:
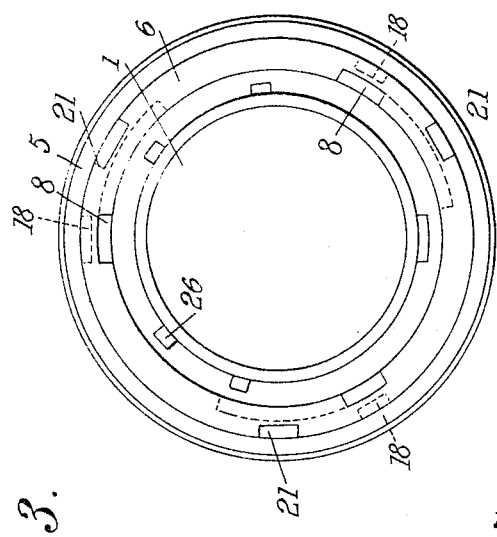
FIG. 3 is an end view of the part carrying the locking means, in unconnected position.
Figure 6:
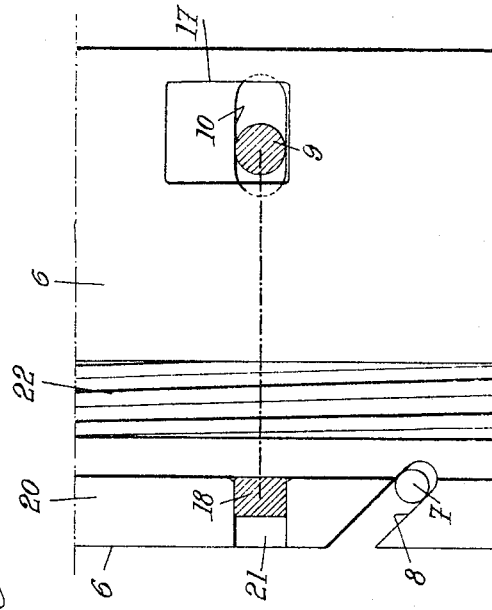
FIGS. 5 and 6 are developed views on a larger scale along line V—V of FIG. 1 showing some elements of the connector, in the unconnecting and connecting positions respectively.

The assembly is then locked in position, lug 7 being located at the end of groove 8 (FIGS. 2 and 6).

It should be further noted that the thrust exerted by the operator on rings 5 and 6 has for its effect to compress spring 23 so that when said rings have been locked on piece 2, the compression of spring 23 tends to maintain the thrust exerted by the contacts of piece 1 against the contacts of piece 2, ensures a good electric connection.

In order to unlock the parts from each other, it suffices to exert a pull upon ring 5. When the movement is continued, the parts are disconnected, the assembly assuming the position of FIG. 1.

Disconnection might be obtained from a distance by means of jaws acting upon the rear edge 27 of ring 5 (FIGS. 1 and 2) which jaws would be pulled by cable for instance.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What I claim is:

1. A connector which comprises, in combination, two parts, a male one and a female one, adapted to engage coaxially, two rings, one surrounding the other and movably carried by one of said parts coaxially therewith, means for guiding the outer of said rings for axial movement only with respect to said one part, means for limiting the movement of the inner of said rings with respect to said outer ring both axially and angularly, a lug carried by the other of said parts, said inner ring being provided with an oblique groove adapted to cooperate with said lug so as to cause said inner ring to rotate with respect to said outer ring when said parts are moved axially toward each other, said inner ring being provided with a transverse surface, a second lug carried by said outer ring adapted to move along said surface, said inner ring being provided with a longitudinal recess opening into said transverse surface and adapted to receive said second lug when the inner ring has been rotated by the full engagement of said first lug in said groove, whereby said rings are locked against relative rotation and a rearward pull on the outer ring is sufficient to separate said parts.

2. A connector according to claim 1 further comprising a spring interposed between said two rings for urging said second lug against said transverse surface of said inner ring.

3. A connector according to claim 1 wherein said means for guiding said one ring for axial movement only with respect to said one part comprises a piece rigid with said first part, said piece being provided with a slot and a third lug carried by said outer ring and guided in said slot, said inner ring being provided with an aperture through which said third lug passes freely.

4. A connector according to claim 1 further comprising a spring interposed between said one part and said inner ring to push said one part against said second part where the parts are engaged.

References Cited by the Examiner

UNITED STATES PATENTS

| 2,152,125 | 3/1939 | Wulle | 339—90 |
| 2,829,358 | 4/1958 | Testori | 339—91 |
| 3,008,116 | 11/1961 | Blanchenot | 339—90 |
| 3,116,942 | 1/1964 | Morello | 339—90 X |

FOREIGN PATENTS 1,297,925  5/1962  France.

EDWARD C. ALLEN, *Primary Examiner.*

W. DONALD MILLER, *Examiner.*